(12) United States Patent
Kaappa et al.

(10) Patent No.: US 7,873,714 B2
(45) Date of Patent: Jan. 18, 2011

(54) PRIORIZATION OF MANAGEMENT OBJECTS

(75) Inventors: Eero Kaappa, Tampere (FI); Jerry Lahti, Budapest (HU)

(73) Assignee: Nokia Corporation, Espoo (FI)

( * ) Notice: Subject to any disclaimer, the term of this patent is extended or adjusted under 35 U.S.C. 154(b) by 690 days.

(21) Appl. No.: 10/718,130

(22) Filed: Nov. 20, 2003

(65) Prior Publication Data

US 2004/0123241 A1   Jun. 24, 2004

(30) Foreign Application Priority Data

Nov. 21, 2002   (FI)   ................................. 20022079

(51) Int. Cl.
*G06F 15/173*   (2006.01)
(52) U.S. Cl. ...................... 709/223; 715/736
(58) Field of Classification Search ................. 709/223, 709/248, 220–221; 719/316; 715/735
See application file for complete search history.

(56) References Cited

U.S. PATENT DOCUMENTS

| | | | | |
|---|---|---|---|---|
| 5,159,667 | A * | 10/1992 | Borrey et al. | 715/500 |
| 5,948,055 | A * | 9/1999 | Pulsipher et al. | 709/202 |
| 6,105,062 | A * | 8/2000 | Andrews et al. | 709/223 |
| 6,212,511 | B1 * | 4/2001 | Fisher et al. | 707/1 |
| 6,266,742 | B1 * | 7/2001 | Challenger et al. | 711/133 |
| 6,834,301 | B1 * | 12/2004 | Hanchett | 709/223 |
| 7,299,413 | B2 * | 11/2007 | Mori | 715/770 |
| 2001/0042059 | A1 * | 11/2001 | Uehara et al. | 707/1 |
| 2002/0065842 | A1 * | 5/2002 | Takagi et al. | 707/500 |
| 2002/0078105 | A1 * | 6/2002 | Hamada et al. | 707/530 |
| 2002/0091819 | A1 * | 7/2002 | Melchione et al. | 709/224 |
| 2003/0101246 | A1 * | 5/2003 | Lahti | 709/221 |
| 2003/0103484 | A1 * | 6/2003 | Oommen et al. | 370/338 |
| 2003/0217181 | A1 * | 11/2003 | Kiiskinen | 709/248 |
| 2004/0039520 | A1 * | 2/2004 | Khavakh et al. | 701/201 |
| 2004/0083472 | A1 * | 4/2004 | Rao et al. | 717/171 |

(Continued)

FOREIGN PATENT DOCUMENTS

WO   WO 97/00567   1/1997

(Continued)

OTHER PUBLICATIONS

SyncML Device Management Bootstrap, version 1.1.1, Oct. 2, 2002.
SyncML Device Management Tree and Description, version 1.1, Feb, 15, 2002.
SyncML Device Management Protocol, version 1.1.1, Oct. 2, 2002.

(Continued)

*Primary Examiner*—Salad Abdullahi
(74) *Attorney, Agent, or Firm*—Hollingsworth & Funk, LLC

(57) ABSTRACT

The invention relates to a method for determining the priority of a management object in a device management system comprising management object data in a management tree for maintaining the arranged device management server and management customer device. The contents of sub objects included in at least one management object of the management tree are determined, and thereafter the management server determines a data element comprising the priority data of the sub objects in relation to other sub objects. The data element is attached to the management tree maintained by the management server, and a file definition according to said management tree is sent to a management customer device. The management customer device deassembles the file definitions into management tree form so that the priority data shows the priority data of the sub objects in relation to the other sub objects.

19 Claims, 3 Drawing Sheets

U.S. PATENT DOCUMENTS

2004/0093342 A1* 5/2004 Arbo et al. .................. 707/102
2004/0128375 A1* 7/2004 Rockwell .................... 709/223
2005/0267878 A1* 12/2005 Mogi et al. .................... 707/3

FOREIGN PATENT DOCUMENTS

| WO | WO 97/34240 | 9/1997 |
| WO | WO 02/054291 A2 | 7/2002 |
| WO | WO 03/049381 | 6/2003 |

OTHER PUBLICATIONS

SyncML Device Management Tree and Description, version 1.1.1, Oct. 2, 2002.
Open Mobile Alliance, "OMA-WAP-ProvCont-v1_1-20021112-d", Nov. 12, 2002.
SyncML Device Management Protocol, version 1.1, http://www.syncml.org/docs/syncml_dm_protocol_v1.1_20020215. Feb. 15, 2002, pp. 2-38.

* cited by examiner

PRIORIZATION OF MANAGEMENT OBJECTS

FIELD OF THE INVENTION

The invention relates to priorization of management objects in a device management system.

BACKGROUND OF THE INVENTION

As different data processing devices, such as mobile phones, are made more complicated, the significance of device management becomes more important. Various settings are required in such devices, for instance settings associated with Internet access points, which are difficult and time-consuming to set manually. Device management solutions have been created in order to solve such problems. The device management solutions allow, for example, an operator of a company's information system or a teleoperator to provide the device with an appropriate configuration. Generally, device management refers to measures that enable external sources of the device to change the configuration of the device, for instance to change the settings or even the protocol the device employs. In addition to the settings associated merely with the device, user-specific data can also be sent, such as user profiles, logos, ringing tones and menus, which allow the user to personally modify the settings of the device or the modification is carried out automatically in connection with device management.

A device management standard is SyncML (Synchronization Markup Language) device management, which is partly based on SyncML data synchronization standard enabling data synchronization. A synchronization server may operate as a device management server and a customer device may operate as a device management client. As to the device management, the customer device functioning as the customer provides the management server performing device management in the starting message of the session with data about itself (the same data as during synchronization) to the server, the management server responding to the data by sending specific data and server management operations. The customer device responds with status information, whereafter the server may end the session or send more server management operations. If the server provides more management operations, the customer device should respond with status information. After receiving status information, the server may end the session or continue the session by providing more server management operations. The device management protocol may also operate so as to provide the user at first with questions about what he/she wants to update, the server then being informed about the choices of the user. The server may thereafter send the updates/operations desired by the user in the following packet.

The objects to be managed in a customer device are arranged as management objects. The management objects constitute of entities in the customer device, which are manageable using the management operations of the management server. A management object may be, for instance, a parameter value or a large entity, such as a wallpaper or screen saver. The management objects are arranged in the SyncML device management into a form resembling a tree in a management tree illustrated in FIG. 1. The management object may be an individual parameter, a sub-tree or a data collection. For example, a 'Vendor' management object is a node, or an interior object, since it is provided with child objects 'Screen Saver' and 'Ringing Tones'. The management object 'Screen Saver' is a leaf object, since it has no child objects. The management object 'Ringing Tones' is also a node or an interior object, because it is provided with child objects. The contents of a management object may also include a link, which indicates another management object. Each object can be indicated using a URI identifier (Uniform Resource Identifier). The URI of the management object is formed starting from a root '/' and as the process proceeds along the tree, each management object is provided with a name that is added to the previous ones using the letter '/' as a distinguishing mark. For example, the management object 'Ringing tones' can be identified using the URI identifier '/Vendor/Ringing Tones/'. Preferably, at least some of the management objects are standardised (the SyncML device management standards currently include three standardised management objects). The management objects may be fixed or dynamic. Dynamic management objects may be added to the management tree from a customer device or management server.

The new dynamic management object must be indicated with a name (address) in the management tree so that the management tree is the same both in the management server and in the customer device. An example of a new management node is a document provided with WAP Provisioning Settings. A new management object can be formed of the document and the data elements included therein, and the management object is provided with new nodes or different settings as child objects. The WAP provisioning document is an XML-based (Extensible Markup Language) file, which comprises different parameter sets associated with the WAP provisioning settings that are consecutively listed. The WAP provisioning document may also comprise parameter sets, which may be mutually alternative, for example, several optional transfer servers or transmission path settings of the network level. In devices that do not employ a management system, the WAP provisioning document is stored as a single document, from which parameter values are read if need be.

What becomes a problem in devices that employ a management system is deassembling the WAP provisioning document and placing parameter sets included therein as well as attributes included therein as management objects into the above management tree. The attributes may be placed into the management tree in a completely different order than their mutual relations require. This is because the SyncML definition does not offer any means for determining the order of the parameter sets and the attributes included therein and for defining the mutual priority based on the WAP provisioning document. In the WAP provisioning document, the priority of the parameter sets and the attributes included therein is defined according to the order thereof. A need therefore arises for a method that determines for instance the priority order of mutually alternative parameter sets when such parameter sets are deassembled from the WAP provisioning document to the management tree.

SUMMARY OF THE INVENTION

Now it has been invented an improved method and an apparatus implementing the method for forming the management tree. As different aspects of the invention a method, a device management system, an electronic device and computer software products are introduced, which are characterized in what is disclosed in the independent claims. The preferred embodiments of the invention are disclosed in the dependent claims.

In accordance with the invention, priority is determined for a management object and sub objects belonging thereto in a device management system comprising at least a device management server and a management customer device, in which the management server and the management customer device are arranged to update management object information in a management tree. The contents of the sub objects belonging to at least one management object in the management tree are determined, and thereafter at least one data element is determined in the management server, the data element comprising the priority data of at least one sub object in relation to other sub objects. Thus at least one data element is attached to the management tree maintained by the management server, and the file definition according to the management tree is sent to the management customer device. The management customer device deassembles the received file definition into the management tree form so that the priority data shows at least the priority data of at least one sub object in relation to other sub objects.

The method of the invention is particularly applicable, but not limited, to a server device according to SyncML Device Management and a customer device according to SyncML device management, in which priority data is determined for the management object comprising Provisioning Settings of a WAP protocol for a Bootstrap process.

In accordance with a embodiment of the invention, the data element is determined in the management server, said data element comprising the priority data of at least one sub object in relation to other sub objects, as separate leaf objects, which are attached to the management tree maintained by the management server so that they are placed in parallel with the management/sub object, whose priority they determine.

In accordance with another embodiment, the data element is determined in the management server, said data element comprising the priority data of at least one sub object in relation to other sub objects, as a run-time property (RTProperty) definition, which is attached to the meta data of the management tree maintained by the management server.

The management object generally refers to an entity associated with the device management of a device to be configured, such as the settings of an Internet access point, without being restricted to the management objects of the SyncML device management. What a data element generally refers to is a management object record provided with a predetermined identifier, such as a data element according to XML language containing at least one or more sub-elements and/or values (in any mode determined for an element). Device management is not restricted to the operations defined in SyncML, but they must be broadly understood as device management to be carried out between any manageable customer device and device management server and as messages required therein.

The solution of the invention provides such an advantage that the method allows deassembling previously problematic management objects and placing the parameter sets and attributes included therein as management objects into the management tree so that the priorities among the management objects are taken into account. Another advantage is that the management server does not have to check afterwards from the management customer device, whether the management objects are placed in the management tree in the correct order. This is an advantage of particularly great importance in the operation of the Bootstrap process, where the management customer device does not provide the management server with an acknowledgement.

BRIEF DESCRIPTION OF THE DRAWINGS

In the following the invention will be described in greater detail by means of the embodiments with reference to the accompanying drawings, in which.

DETAILED DESCRIPTION OF THE INVENTION

In the following, a preferred embodiment of the invention is described in a system supporting SyncML device management. However, it should be noted that the invention could be applied in any device management system, where management objects of a device can be organized in other ways than merely as a tree structure.

Figure 2:
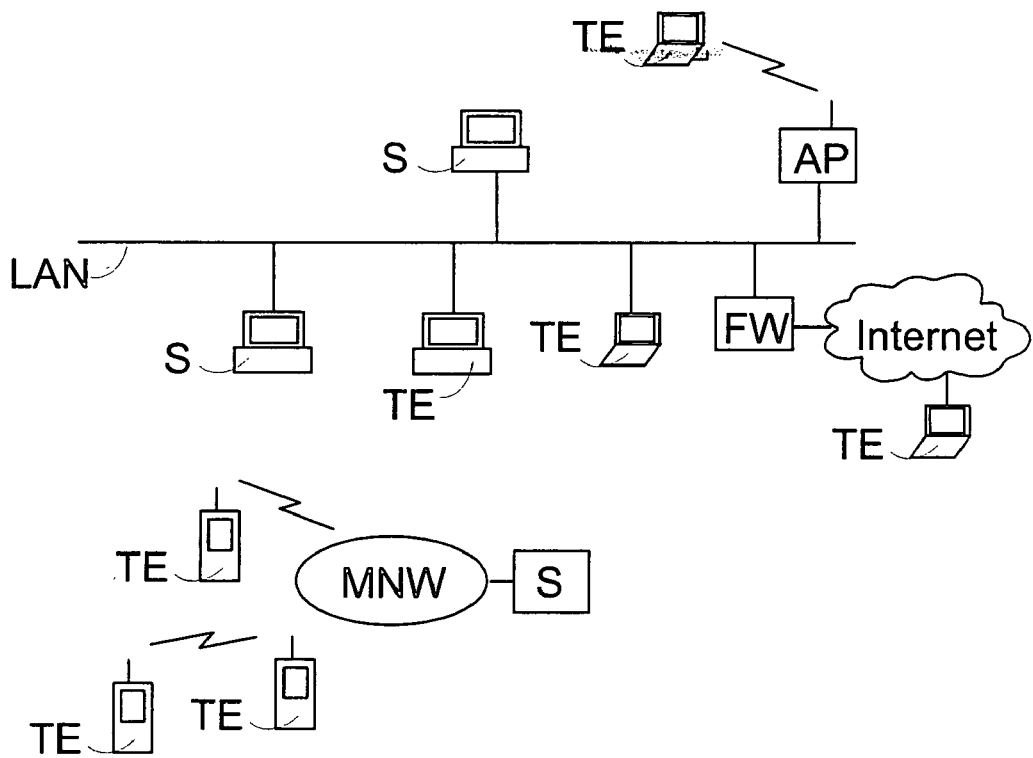
FIG. 2 illustrates a management system.

FIG. 2 illustrates a networked system. A network server or PC typically operates as a server S. Typically, the terminal TE is a mobile phone, a PC (Personal Computer), a laptop computer, or a PDA device. For clarity, it is noted in the following embodiments that regarding device management, the terminal TE operates as a customer device and the server S as a management server. The server S may manage several customer devices TE. However, it is possible that the terminal TE carries out the functionalities of the management device, whereby another terminal or server S may function as the customer device.

FIG. 2 shows two examples. In the first example, customer devices TE and management servers S are connected to a local area network LAN. The customer device TE connected to the network LAN comprises a functionality, for instance software controlling a network card and data transmission, for communicating with the devices in the network LAN. The local area network LAN may be a local network of any kind and the TE may communicate with the server S also through the Internet, typically using a firewall FW. The terminal TE may also be connected to the local area network LAN wirelessly through access points AP. In the second example, the customer device TE communicates with the server S through a mobile network MNW. The terminal TE connected to the network MNW comprises a mobile message functionality for wirelessly communicating with the network MNW. In addition, other networks such as the local area network LAN can be placed between the mobile network MNW and the server S. The mobile network MNW may be any already known wireless network, for instance a network supporting the GSM service, a network supporting the GPRS service (General Packet Radio Service), a third generation mobile network such as a mobile network according to the $3^{rd}$ Generation Partnership Project network definitions, a wireless local area network WLAN, a private network or a combination of such networks. An important service of the transport layer in several mobile networks is WAP, which offers by means of a Wireless Session Protocol WSP layer included therein a transport service for the device management application layer in the customer device TE and the server S. Then, the system comprises at least one WAP gateway and possibly one or more WAP Proxy servers. The WAP supports many transmission techniques of lower layers, such as the HTTP or OBEX standards. For example, circuit-switched or packet-switched data transmission or SMS-based transmission in accordance with the mobile network MNW properties can be employed as the lower layer transmission techniques. In addition to the examples shown in FIG. 2, other device management configurations are also possible.

Figure 3:
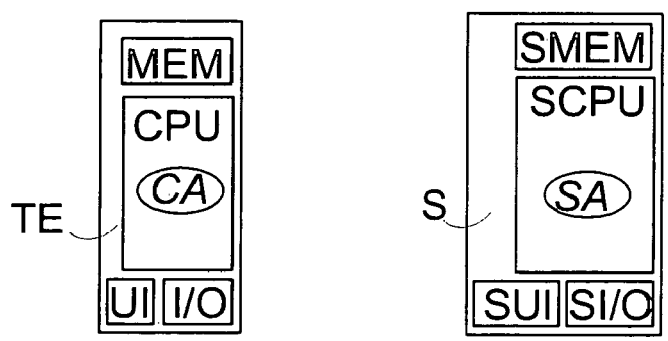
FIG. 3 illustrates a server and a customer device.

As FIG. 3 illustrates, the terminal TE and the server S comprise memory MEM; SMEM, a user interface UI; SUI, I/O means I/O; SI/O for arranging data transmission, and one or more central processing units CPU; SCPU comprising a processor. The memory MEM; SMEM includes a non-volatile portion for storing the applications controlling the central processing unit CPU; SCPU and other data to be stored and a volatile portion to be used for temporary data processing. The memory MEM of the terminal TE stores management objects, the structure of which is also maintained in a management tree in the memory SMEM of the server S.

The TE operating as a customer device according to the SyncML device management standard comprises a customer agent CA, which attends to the operations associated with the management session in the customer device. The device S operating as a management server comprises a server agent SA handling the management session. The customer agent CA may be implemented by performing in the CPU computer software code stored in the memory MEM and the SA by performing in the SCPU computer software code stored in the memory SMEM. As noted previously, the TE and the S may operate as a management server and/or as a customer device. Thus, for example the terminal TE may also comprise at least partly the functions of the server agent SA, in which case it may also operate as a management server during data transmission between the terminals TE. The computer software codes to be carried out in the central processing units CPU and SCPU may allow the terminal TE and the server S to also implement the inventive stages associated with addressing the priority of the management objects, some of the preferred embodiments thereof being illustrated in FIGS. 4 and 5. The computer software may be stored into any memory means, such as the hard disk of a PC or a CD-ROM disc, from where it can be loaded into the memory MEM; SMEM of the implementing device TE; S. It is also possible to use hardware solutions or a combination of hardware and software solutions for implementing the inventive means.

The management objects are typically based on XML language. A document type definition DTD is defined for XML-based documents. The DTD defines in XML language the tags to be used, the structural relations of the elements between the tags, the attributes defining the properties of the elements and the parameters describing the attributes and the values thereof. As is known in the XML language, a data element starts from an initial tag (for instance <section>) and ends at the end tag (</section>), and the tag may contain text as well as other elements. The DTD is involved in all documents or the documents refer to an already known DTD.

As described above, the method of the invention is particularly applicable to transfer WAP provisioning settings to the terminal TE. The method is particularly useful in the Bootstrap process, in which the required application settings and general device-specific settings, such as one-directional WAP settings, are sent to the un-configured terminal TE. The Bootstrap process thus deviates from typical SyncML device management, in which a status is sent from the terminal. The application settings and general device-specific settings, such as WAP settings, can be transferred utilizing the WAP protocol to the terminal, and thereafter the new management objects according to the WAP provisioning settings must be added to the management tree of the SyncML device management protocol. In order to be able to deassemble the WAP provisioning document and to place the parameter sets included therein as well as the attributes therein as management objects into the above described management tree, an additional data element is determined to the management tree in accordance with the invention indicating the order of the different management objects and the priority among them.

Then, the management server S at first determines the contents of a new WAP provisioning document, and thereafter determines a data element for the parameter sets included in the WAP provisioning document and for the attributes included therein, the data element indicating the order of the different management objects and the priority among them, whereafter the management server updates the management tree using the data element concerned. After this, the management server sends the WAP provisioning document to the terminal TE. In response to the message of the management server S, the terminal TE deassembles the received WAP provisioning document, then updates the management tree in accordance with the data element indicating the order of the management objects and the priority among them, and stores the contents of the WAP provisioning document so that the definitions of the data element are taken into account. The terminal TE then includes the required WAP configuration, which allows using the WAP services without the user having to set the settings manually. The configuration can later be changed by pointing at it with a defined tag. For a more detailed description of the data elements included in the WAP provisioning document, reference is made to WAP Forum WAP specification WAP-292-ProvCont-20020815-d "*Provisioning Content, Draft Version*, 12 Oct. 2002".

Figure 4:
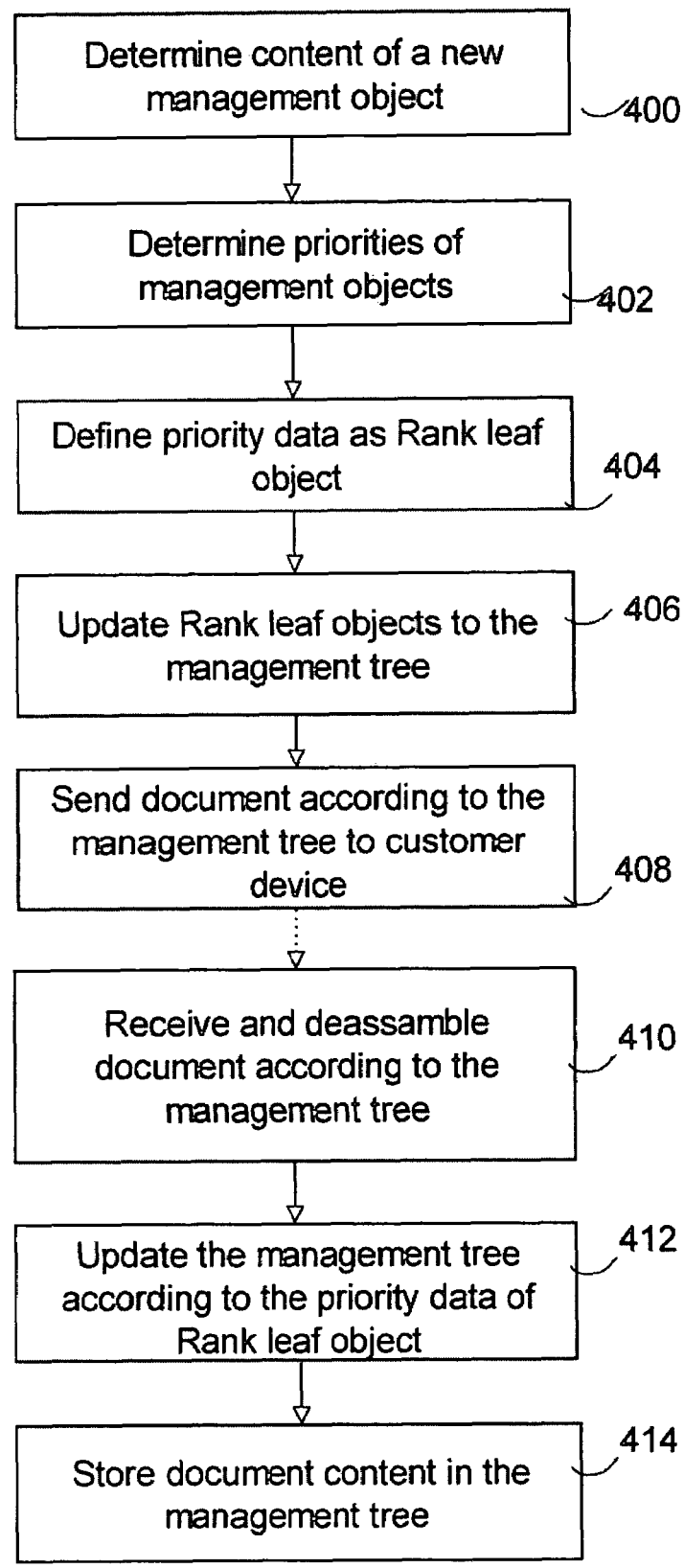
FIG. 4 illustrates a method according to a first embodiment of the invention.

Attaching the above described data element to the management tree can preferably be carried out in at least two different ways. FIG. 4 illustrates the method according to a first preferred embodiment for connecting the data element to the management tree. When the WAP provisioning settings are determined in the management server, contents (400) of a new WAP provisioning document is at first determined. The WAP provisioning document may comprise several object types, such as interior objects, leaf objects or link objects. The sub-elements included in the WAP provisioning document, referred to as attributes, can be added to the management tree as specific nodes and/or leaves. Information is thus determined for the management objects or for some of the management objects of the WAP provisioning document thus determined, said information indicating the order of the different management objects and the priority (402) among them.

Figure 1:
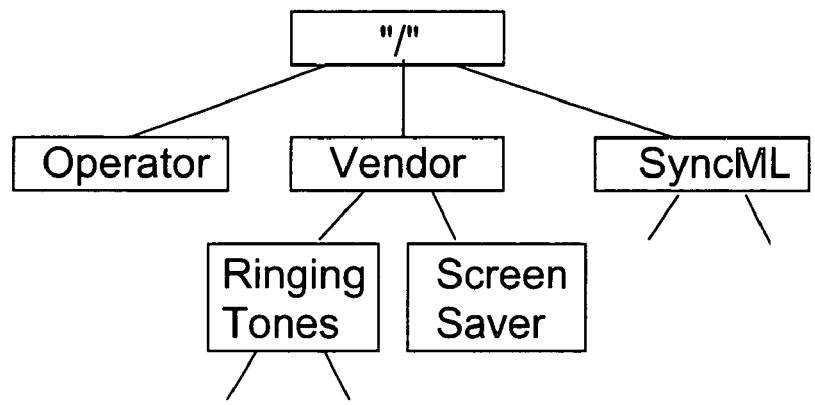
FIG. 1 illustrates a management tree.

In this embodiment, information is determined as separate leaf objects (404) placed in the management tree in parallel at the same level in the management tree as the management object, whose priority they determine (cf. FIG. 1). Such Rank leaf objects indicate the priority of a parallel management object to the other management objects, which parallel management object may therefore be for instance an individual parameter, a subtree or a parameter set. It should be noted that a priority does not necessarily have to be determined for all management objects in a WAP provisioning document; instead, the contents of the WAP provisioning document are such that the priority data should be determined for only some or for only one of the management objects.

After this, the management tree that is based on the WAP provisioning document can be updated (or if it does not exist, it can be formed) so that it comprises the Rank leaf objects (406) required for determining the priority of the management objects. The management server S thereafter sends the WAP-provisioning document comprising the Rank leaf objects to the terminal TE (408). Here, the mechanisms of the device management protocol can be utilized as well as the messages determined for it. As to a more detailed description of the SyncML device management protocol, reference is made to the specification of the SyncML organization "*SyncML Device Management Protocol*", version 1.1.1, 2 Oct. 2002.

The terminal TE receives the WAP provisioning document and deassembles the information (410) therein. The terminal interprets the Rank leaf objects included in the document and updates (or forms) thereafter the management tree in response to the order of the management objects determined by the Rank leaf objects and to a priority (412) among them. As the contents of the WAP provisioning document is stored in accordance (414) with the management tree, the terminal TE then comprises the required WAP configuration for using the WAP services.

Figure 5:
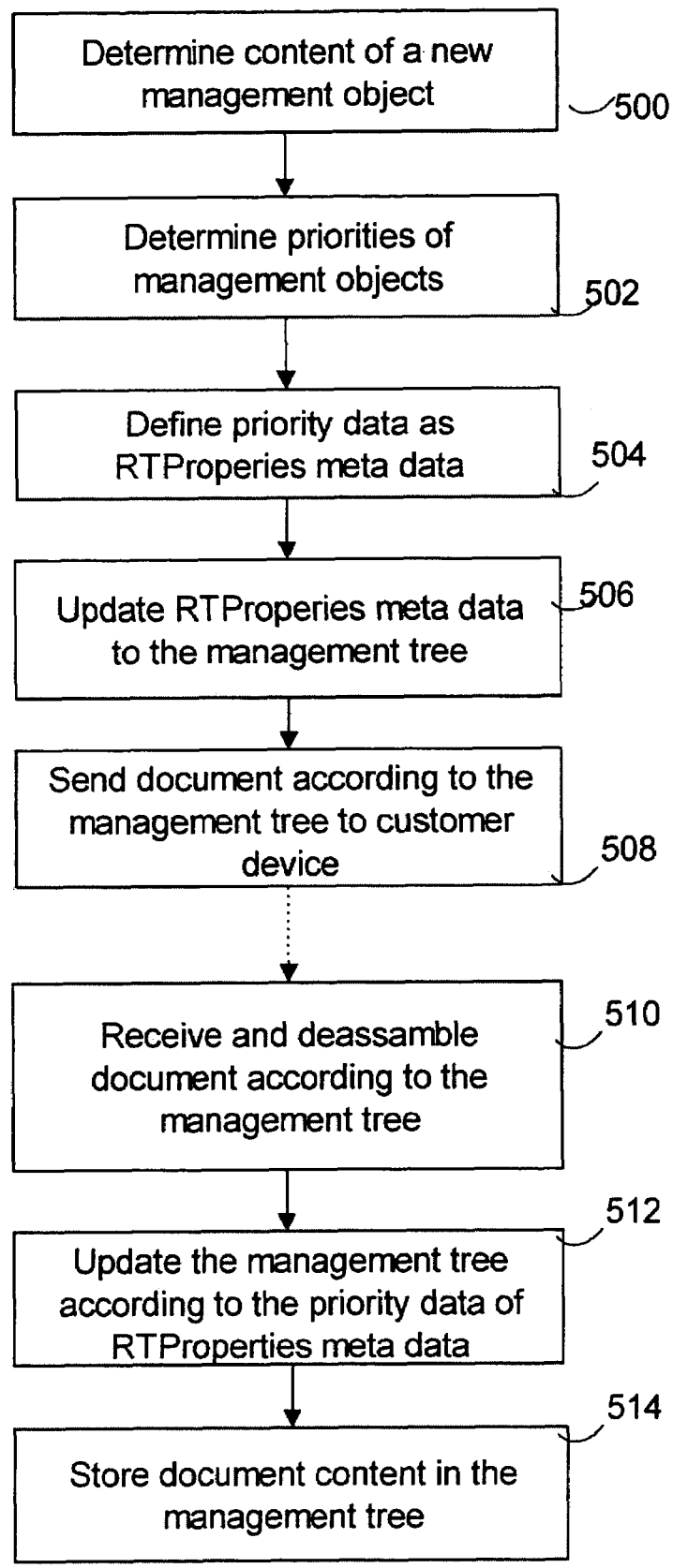
FIG. 5 illustrates a method according to a second embodiment of the invention.

FIG. 5 illustrates a method according to a second preferred embodiment for attaching a data element to the management tree. What is determined at first is contents (500) of the new WAP provisioning document and the order of the different management objects of the WAP provisioning document and information (502) indicating the priority among them. These stages correspond with stages 400, 402 in FIG. 4.

In this embodiment, said information is determined as a portion of meta data (504) in the management tree, whereby the priority data can be modelled as a run-time property. In SyncML device management the meta data of the management tree can be provided with an optional run-time properties (RTProperties) definition comprising different run-time definitions of the management objects. As regards the details of the RTProperties elements, reference is made to the specification of the SyncML organization "*SyncML Device Management Tree and Description*", version 1.1.1, 2 Oct. 2002, in which a new field "Priorities" can be added in accordance with the embodiment into the RTProperties fields described in chapter 7, and the contents of said field can be determined as illustrated above.

Then, the management tree that is based on the WAP provisioning document can be updated (or if it does not exist, it can be formed) so that it comprises RTProperties definitions (506) attached to the meta data of the management tree required for the determination of the priority of the management objects. The management server S then sends the WAP provisioning document to the customer device TE (508).

The terminal TE receives the WAP provisioning document and deassembles the information (510) therein. The terminal interprets the RTProperties definitions included in the meta data of the management tree and updates (or forms) thereafter the management tree in response to the order of the management objects determined by the RTProperties definitions and to a priority (512) among them. Finally, the contents of the WAP provisioning document are stored in accordance (514) with the management tree to the terminal TE.

According to a preferred embodiment, the priority order of the attributes in the WAP provisioning document can be determined so that alternative attributes are for instance named differently and the priority order of the names is predetermined.

The above-described embodiments show that as regards the management of the device, the terminal TE operates as a customer device and the server S as a management server. However, it is possible that the terminal TE carries out the functionalities of the management device, whereby another terminal or server S may function as the customer device. A typical situation is such that the terminal user has determined or modified himself/herself the WAP provisioning settings of the terminal. Thus, in order to ensure the operation of the management system, the changed WAP provisioning settings have to be updated for the server S, in which case the above-described embodiments are carried out in reverse (from the terminal to the server).

It is apparent for those skilled in the art that as technology advances the basic idea of the invention can be implemented in various ways. The invention and the embodiments thereof are thus not restricted to the above examples but may vary within the scope of the claims.

The invention claimed is:

1. A method comprising:
   determining, in a device management server, the contents of sub-objects in a new management object associated with a management tree, said management tree being maintained by the device management server;
   determining, in the device management server, at least one data element comprising priority data of at least one sub-object in relation to other sub-objects, of the new management object;
   attaching, in the device management server, said at least one data element to the management tree maintained by the management server; and
   sending, by the device management server, a document according to the management tree to a management customer device.

2. A method as claimed in claim 1, wherein said management object comprises provisioning settings of a WAP protocol for a Bootstrap process.

3. A method as claimed in claim 1, wherein
   said determining the at least one data element, comprising the priority data of at least one sub-object in relation to other sub-objects, comprises determining the at least one data element as at least one separate leaf sub-object in the management object; and
   said attaching comprises attaching the determined at least one leaf sub-object, determining said priority data, to the management tree in parallel with one or more management sub-objects, whose priority is determined by the attached at least one leaf sub-object.

4. A method as claimed in claim 1, wherein
   said determining the at least one data element, comprising the priority data of at least one sub-object in relation to other sub-objects, comprises determining the at least one data element as a run-time property definition, and
   said attaching comprises attaching said run-time property definitions determining said priority data to meta data of the management tree maintained by the management server.

5. A device management system comprising: a device management server, and
   a management customer device,
   wherein the management server and the management customer device are configured to maintain management object data in a management tree for managing configuration of the management customer device, and to determine the contents of a new management object; and
   the management server is further configured to
   determine priority of at least one sub object, belonging to the management object, in relation to other sub objects;
   determine at least one data element comprising the priority data of at least one sub object in relation to other sub objects, wherein the data element is a management object;
   attach said at least one data element to the management tree maintained by the management server; and to
   send a document according to the management tree to the management customer device, and
   the management customer device is configured to deassemble said document into management tree form so that said priority data shows the priority data of at least one sub object in relation to other sub objects and is further configured to update or form the management tree in accordance with the data element comprising said priority data, wherein content of the document is stored in the management customer device in accordance with the management tree.

6. A management system as claimed in claim 5, wherein the management server is configured to determine the data element comprising the priority data of at least one sub object in relation to other sub objects, as separate leaf objects; and attach the leaf objects determining said priority data to the management tree maintained by the management server so that they are placed in parallel with the management/sub object, whose priority they determine.

7. A management system as claimed in claim 5, wherein the management server is configured to determine the data element comprising the priority data of at least one sub object in relation to other sub objects, as a run-time property definition; and to attach said run-time property definitions determining said priority data to the meta data of the management tree maintained by the management server.

8. An apparatus comprising:

a memory configured to store computer code and to maintain a management tree for managing configuration of a customer device; and a processor, the memory and the computer code, working with the processor, being configured to cause the apparatus to perform at least the following:

determine the contents of sub-objects in a new management object associated with the management tree;

determine at least one data element comprising priority data of at least one sub-object in relation to other sub-objects, of the new management object;

attach said at least one data element to the management tree maintained by the management server; and send a document according to said management tree to at least one customer device.

9. An apparatus as claimed in claim 8, wherein the apparatus supports syncML device management and wherein the management object comprises provisioning settings of a WAP protocol for a Bootstrap process.

10. An apparatus comprising:

a memory configured to store computer code and to maintain a management tree for managing configuration of the apparatus; and a processor, the memory and the computer code, working with the processor, being configured to cause the apparatus to perform at least the following:

receive a document comprising device management operations from a management server, and deassemble the document received from the management server into management tree form, on the basis of at least one data element comprising priority data of at least one sub-object in relation to other sub-objects, so that said priority data shows the priority data of at least one sub-object in relation to other sub-objects, and update or form the management tree in accordance with the data element comprising said priority data, wherein content of the document is stored in the apparatus in accordance with the management tree.

11. An apparatus as claimed in claim 10, wherein the apparatus supports SyncML Device Management and wherein the management object comprises provisioning settings of a WAP protocol for a Bootstrap process.

12. A computer-readable memory, wherein the computer-readable memory comprises computer-executable instructions stored thereon for enabling a data processing device to maintain a management tree for managing configuration of the data processing device, determine contents of sub-objects in a new management object associated with the management tree, determine at least one data element comprising priority data of at least one sub-object in relation to other sub-objects, of the new management object, attach said at least one data element to the management tree maintained by the data processing device, and send a document according to the management tree to a management customer device.

13. A computer-readable memory as claimed in claim 12, comprising computer-executable instructions stored thereon for enabling the data processing device to determine the at least one data element by means of at least one separate leaf sub-object; and attach the leaf sub-object determining said priority data to the management tree so that the at least one leaf sub-object is placed in parallel with the management sub-objects, whose priority the leaf sub-object determines.

14. An apparatus as claimed in claim 8, wherein the memory and the computer code, working with the processor, are further configured to cause the apparatus to determine the at least one data element as at least one separate leaf sub-object, and attach the leaf sub-object determining said priority data to the management tree so that the at least one leaf sub-object is placed in parallel with the management sub-objects, whose priority the leaf sub-object determines.

15. An apparatus as claimed in claim 8, wherein the memory and the computer code, working with the processor, are further configured to cause the apparatus to determine the data element as at least one run-time property definition, and attach said run-time property definition, determining said priority data, to meta data of the management tree.

16. An apparatus as claimed in claim 10, wherein the apparatus is configured to operate as a management customer device in a device management system.

17. A method comprising:

receiving, in a terminal, a document including device management operations from at least one management server;

deassembling, in the terminal, the document into management tree form, on the basis of at least one data element comprising priority data of at least one sub-object, wherein the data element is a management object and belongs to a new management object, in relation to other sub-objects, so that said priority data shows the priority data of at least one sub-object in relation to other sub-objects; and updating or forming, by the terminal, the management tree in accordance with the data element comprising said priority data, wherein content of the document is stored in accordance with the management tree in the terminal.

18. A method as claimed in claim 17, wherein the management object comprises provisioning settings of a WAP protocol for a Bootstrap process.

19. A computer-readable memory, wherein the computer-readable memory comprises computer-executable instructions stored thereon for enabling a device to receive a document including device management operations from at least one management server;

deassemble the document into management tree form, on the basis of at least one data element comprising priority data of at least one sub-object, wherein the data element is a management object and belongs to a new management object, in relation to other sub-objects, so that said priority data shows the priority data of at least one sub-object in relation to other sub-objects; and update or form the management tree in accordance with the data element comprising said priority data, wherein content of the document is stored in the apparatus in accordance with the management tree.

* * * * *

UNITED STATES PATENT AND TRADEMARK OFFICE
CERTIFICATE OF CORRECTION

PATENT NO.         : 7,873,714 B2
APPLICATION NO.    : 10/718130
DATED              : January 18, 2011
INVENTOR(S)        : Eero Kaappa and Jerry Lahti It is certified that error appears in the above-identified patent and that said Letters Patent is hereby corrected as shown below:

Column 8, line 7, Claim 1: "management server, . at" should read --management server, at--.

Signed and Sealed this
Nineteenth Day of April, 2011

David J. Kappos
*Director of the United States Patent and Trademark Office*